No. 630,428. Patented Aug. 8, 1899.
H. A. WAHLERT.
PIPE CLAMP.
(Application filed Apr. 24, 1899.)
(No Model.) 2 Sheets—Sheet 1.

Witnesses:
E. T. Walker
M. F. Hunton

Inventor:
Henry A. Wahlert
by F. W. Ritter
Atty

No. 630,428. Patented Aug. 8, 1899.
H. A. WAHLERT.
PIPE CLAMP.
(Application filed Apr. 24, 1899.)
(No Model.) 2 Sheets—Sheet 2.
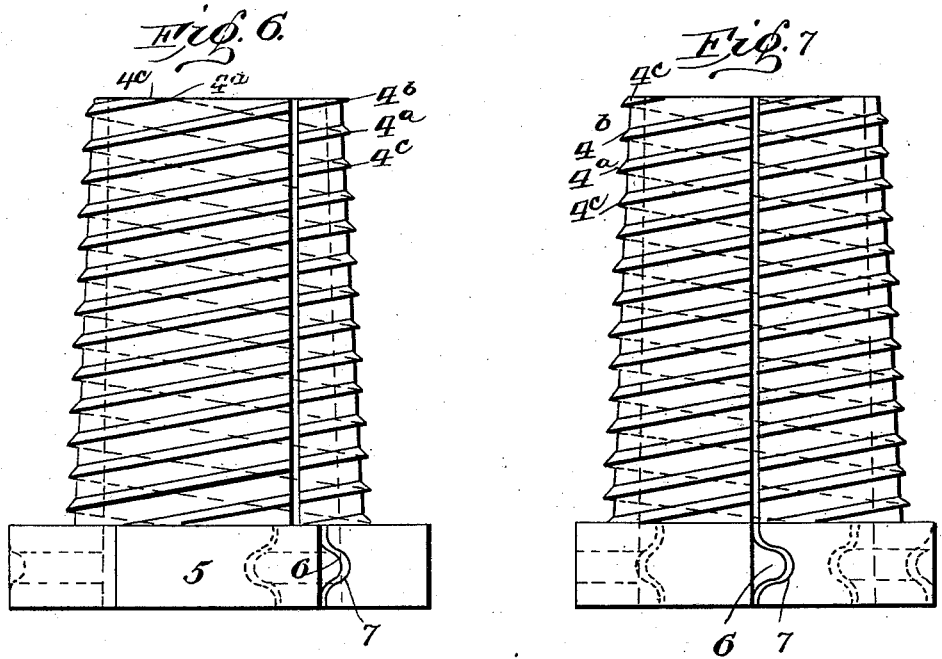
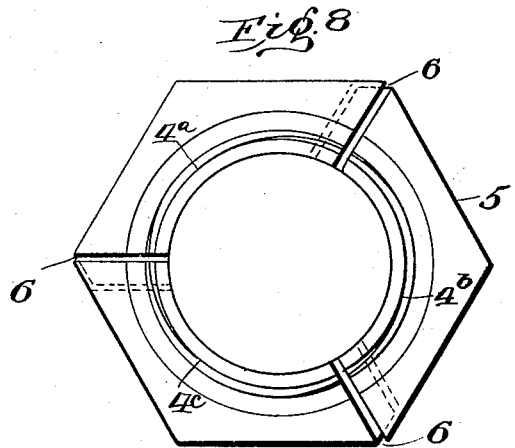
Witnesses:
J. M. Fowler Jr.
M. Darley.
Inventor:
Henry A. Wahlert
by F. W. Ritter Jr.
Attorney

UNITED STATES PATENT OFFICE.

HENRY A. WAHLERT, OF ST. LOUIS, MISSOURI, ASSIGNOR TO THE ACME PIPE CLAMP COMPANY, OF SAME PLACE.

PIPE-CLAMP.

SPECIFICATION forming part of Letters Patent No. 630,428, dated August 8, 1899.

Application filed April 24, 1899. Serial No. 714,256. (No model.)

*To all whom it may concern:*

Be it known that I, HENRY A. WAHLERT, a citizen of the United States, residing at St. Louis, in the State of Missouri, have invented certain new and useful Improvements in Pipe-Clamps; and I hereby declare the following to be a full, clear, and exact description of the same, reference being had to the accompanying drawings, in which—

Figure 1:
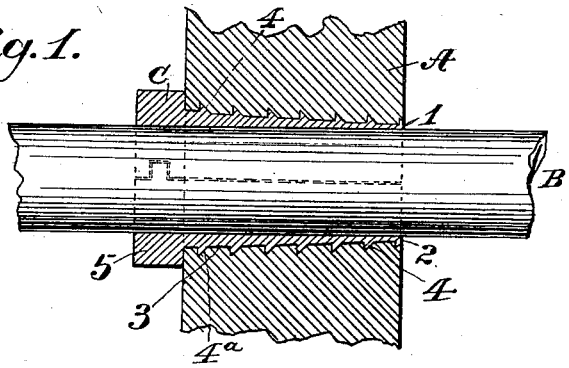
Figure 2:
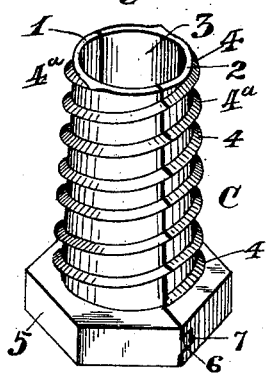
Figure 3:
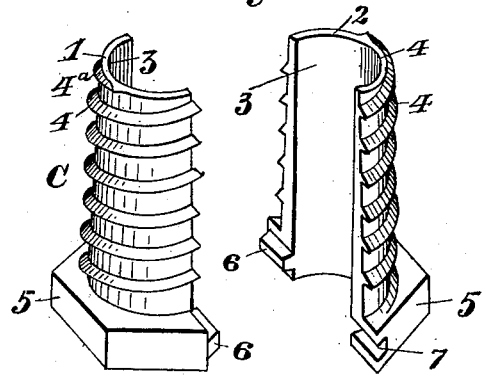
Figure 5:
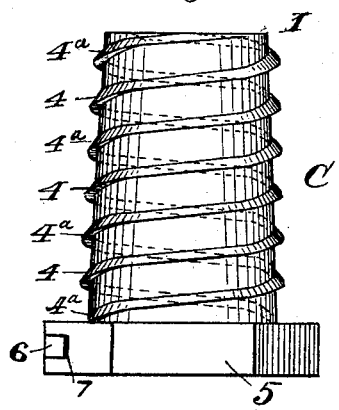
Figure 4:
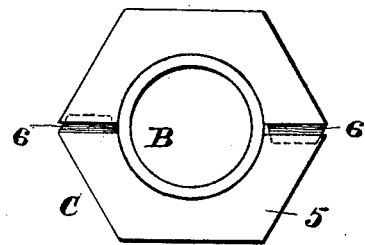

Figure 1 is a longitudinal sectional view of a car-sill or other timber through which passes a line of pipe or piece of tubing and a pipe-clamp embodying my invention applied to clamp and hold the pipe. Fig. 2 is a detached perspective view of the pipe-clamp. Fig. 3 is a perspective view of the sections which compose the clamp detached or separated. Fig. 4 is an end view of the pipe-clamp and inclosed pipe or tube. Fig. 5 is an elevation of the pipe-clamp portions of the threads, shown in dotted lines. Figs. 6 and 7 are side elevations from different points of view of a three-part pipe-clamp embodying my invention, and Fig. 8 is an end view of the three-part clamp shown in Figs. 6 and 7.

Like symbols refer to like parts wherever they occur.

The object of the present invention is to secure a simple and efficient detachable and separable clamp for securing a pipe or tube against longitudinal or endwise movement where the pipe passes through timber, and while the device which embodies my invention is of general utility where a pipe-clamp is required it has been more especially designed for anchoring the train-pipes of an air-brake system where the pipe passes through sill-timbers of the car or like obstructions.

To this end the main feature of my invention embraces a tubular clamp comprised of a plurality of longitudinal sections of tapering form externally threaded, the number of threads being equal to or a multiple of the longitudinal sections which comprise the clamp, there being at least one thread for each section composing the clamp, said sections being counterparts one of the other.

There are other minor features of invention, all as will hereinafter more fully appear.

I will now proceed to describe my invention more fully, so that others skilled in the art to which it appertains may apply the same.

In the drawings, A indicates a portion of a car-sill or equivalent timber, through which the pipe or tube B passes, and C the clamp embodying my invention.

The clamp C is comprised of a plurality of longitudinal sections, preferably two, (marked 1 and 2 in the drawings, Figs. 1 to 5, inclusive,) which combined as a whole will form less than a circle, so that when forced together they will adapt themselves to or clamp the included pipe or tube, and no matter how many sections may be used their sum will constitute less than a complete circle. The interior of each section is straight, as at 3, so that the walls of the combined sections which form the pipe-seat will be parallel when the sections 1 and 2 are in position on the pipe, and the clamp as a whole may rotate around the pipe until such time as it binds and clamps the same. The sections preferably decrease in thickness, or are tapering or wedge-shaped in section, and are threaded on the exterior, as at 4 $4^a$, a thread for each section, there being two in the two-part clamp shown in Figs. 1 to 5 and three (marked $4^a$ $4^b$ $4^c$) in the three-part clamp shown in Figs. 6 to 8, which threads start from the respective clamp-sections, and said threads may be given any desired pitch. The sections are flanged to constitute, when they are united, a polygonal head 5, to which a wrench may be applied for inserting or withdrawing the clamp from timber A, and in order to prevent any independent longitudinal movement of the sections which would interrupt the threads 4 $4^a$ the said sections on their contiguous edges are provided with interlocking lugs and recesses 6 7.

The clamp, being constructed of longitudinal sections substantially as hereinbefore set forth, is applied by arranging the sections thereof to inclose the pipe, with the ends of said sections introduced into the pipe-opening of timber A, the lugs 6 and notches 7 of the sections interlocking, after which a suitable wrench is applied to the head 5 and the clamp rotated until it has been forced a sufficient distance into the timber—preferably until the flange rests on the timber—and the sections have been caused to bind upon and securely clamp the pipe.

By the construction hereinbefore set forth an efficient clamp is obtained and one readily and easily applied where the space is limited and clamps of the usual form could not be used, and, furthermore, it will be noted that the longitudinal sections which compose the clamp are counterparts or the same in form, which greatly facilitates manufacture thereof.

The essentials of my invention, as hereinbefore set forth, may be briefly stated as follows: First, there must be a plurality of sections which taken as a whole constitute less than a true circle, and, second, there must be at least one thread for each section comprising the clamp, or, in other words, the number of threads must be at least the same as the number of sections which comprise the clamp, and as a desirable embodiment of the invention I have illustrated it as applied to a two-part clamp having two threads and a three-part clamp having three threads; but it will be evident to any person skilled in the art that the number of sections may be increased, provided that at least one thread is added for each additional section, and it will also be obvious that it is simply a mathematical problem to increase the threads by multiples of the number of parts and retain the characteristic feature of the invention—viz., that the sections shall be counterparts. Thus, for instance, a two-part clamp may have two, four, six, or eight threads, a three-part clamp may have three, six, nine, or twelve threads, and so on, the number of threads being the number or a multiple of the number of the parts comprising the clamp; but it is equally obvious that nothing material will be gained thereby nor will the principle involved be modified.

Having thus described my invention, what I claim, and desire to secure by Letters Patent, is—

1. A tubular clamp comprised of a plurality of sections externally threaded, said sections being counterparts and the number of threads on the clamp as a whole being at least equal in number to the number of sections which comprise the clamp, substantially as and for the purposes specified.

2. A tubular clamp comprised of a plurality of sections which taken together constitute less than a true circle, said sections being counterparts, and said clamp as a whole having external threads at least equal in number to the number of sections which comprise the clamp, substantially as and for the purposes specified.

3. A tubular clamp comprised of a plurality of sections externally threaded said sections being counterparts and provided with interlocking devices, the clamp as a whole having at least as many threads as it has sections which comprise the clamp, substantially as and for the purposes specified.

4. A tubular clamp comprised of a plurality of sections externally threaded, said sections being counterparts and provided with interlocking devices and means for rotating the clamp as a whole, the clamp as a whole having at least as many threads as there are sections which comprise the clamp, substantially as and for the purposes specified.

HENRY A. WAHLERT.

Witnesses:
WM. E. DYRE,
M. DARLEY.